US008548996B2

(12) United States Patent
Tareen et al.

(10) Patent No.: US 8,548,996 B2
(45) Date of Patent: Oct. 1, 2013

(54) RANKING CONTENT ITEMS RELATED TO AN EVENT

(75) Inventors: Amra Q. Tareen, San Francisco, CA (US); Erik Sundelof, Palo Alto, CA (US); Lawrence A. Birnbaum, Evanston, IL (US); Kristian J. Hammond, Chicago, IL (US); Sanjay C. Sood, Claremont, CA (US)

(73) Assignee: PulsePoint, Inc., New York, NY (US)

(*) Notice: Subject to any disclaimer, the term of this patent is extended or adjusted under 35 U.S.C. 154(b) by 345 days.

(21) Appl. No.: 12/215,684

(22) Filed: Jun. 27, 2008

(65) Prior Publication Data
US 2009/0049041 A1 Feb. 19, 2009

Related U.S. Application Data

(60) Provisional application No. 60/937,685, filed on Jun. 29, 2007.

(51) Int. Cl.
*G06F 7/00* (2006.01)
*G06F 17/30* (2006.01)

(52) U.S. Cl.
USPC .......... 707/732; 707/733; 707/734; 707/723; 707/748

(58) Field of Classification Search
None
See application file for complete search history.

(56) References Cited

U.S. PATENT DOCUMENTS

| | | | | |
|---|---|---|---|---|
| 5,835,087 A * | 11/1998 | Herz et al. | ............. | 715/810 |
| 6,895,385 B1 * | 5/2005 | Zacharia et al. | ............. | 705/7.29 |
| 7,617,160 B1 * | 11/2009 | Grove et al. | ............. | 705/500 |
| 7,822,631 B1 * | 10/2010 | Vander Mey et al. | ......... | 705/7.29 |
| 8,200,477 B2 * | 6/2012 | Yi et al. | ............. | 704/9 |
| 2001/0047290 A1 * | 11/2001 | Petras et al. | ............. | 705/10 |
| 2002/0062368 A1 * | 5/2002 | Holtzman et al. | ............. | 709/224 |
| 2004/0162751 A1 * | 8/2004 | Tsyganskiy et al. | ............. | 705/10 |
| 2005/0125216 A1 * | 6/2005 | Chitrapura et al. | ............. | 704/1 |
| 2007/0078845 A1 * | 4/2007 | Scott et al. | ............. | 707/5 |
| 2007/0143300 A1 * | 6/2007 | Gulli et al. | ............. | 707/10 |
| 2007/0192169 A1 * | 8/2007 | Herbrich et al. | ............. | 705/10 |
| 2007/0260624 A1 * | 11/2007 | Chung et al. | ............. | 707/101 |
| 2007/0294281 A1 * | 12/2007 | Ward et al. | ............. | 707/102 |
| 2008/0109245 A1 * | 5/2008 | Gupta | ............. | 705/1 |
| 2008/0126303 A1 * | 5/2008 | Park et al. | ............. | 707/3 |
| 2008/0243906 A1 * | 10/2008 | Peters | ............. | 707/102 |
| 2010/0257184 A1 * | 10/2010 | Uy | ............. | 707/748 |

OTHER PUBLICATIONS

Evgeniy Gabrilovich, Susan Dumais, Eric Horvitz "Newsjunkie: Providing Personalized Newsfeeds via Analysis of Information Novelty" May 17-22, 2004. ACM.*

* cited by examiner

*Primary Examiner* — Polina Peach
(74) *Attorney, Agent, or Firm* — Sprinkle IP Law Group (57) ABSTRACT

Ranking content items is disclosed. A user input is received from each of one or more users indicating an opinion of the user with respect to a content item included in a plurality of content items. Based at least in part on a number of users from whom user input has been received, a degree is determined to which a ranking of the content item relative to one or more other content items in the plurality of content items is determined by user input.

9 Claims, 11 Drawing Sheets

Profiles for the Masala scoring for different values of the relevance score, R, and user votes, s

RANKING CONTENT ITEMS RELATED TO AN EVENT

CROSS REFERENCE TO OTHER APPLICATIONS

This application claims priority to U.S. Provisional Patent Application No. 60/937,685 entitled SYSTEM AND METHODS FOR RETRIEVING, RANKING, AND PRESENTING CONTENT RELATED TO AN EVENT filed Jun. 29, 2007 which is incorporated herein by reference for all purposes.

BACKGROUND OF THE INVENTION

When displaying content items to a user, the content items are typically ranked so that a desired set of content items is displayed first. One problem is that, when a user rating is used to rank items, a content item with only a few ratings that are very high can be displayed within the desired set. However, this content item may not be appropriately ranked because the few very high ratings may not represent the content item's rating after more ratings are aggregated.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ranking content items is disclosed. A user input is received from each of one or more users indicating an opinion of the user with respect to a content item included in a plurality of content items. Based at least in part on a number of users from whom user input has been received, a degree is determined to which a ranking of the content item relative to one or more other content items in the plurality of content items is determined by user input. In some embodiments, the content item is associated with an event. In some embodiments, the user input is weighted by a user reputation. In some embodiments, the degree or contribution of user ratings to the overall ranking varies depending on how many user ratings there are; if there are very few, they are not counted much (e.g., to discount being a non-representative sample); if there are more, they are counted more; at some point though the contribution levels out with regard to the number of user ratings.

Ranking content items is disclosed. A relevance of a content item to an event is determined. A user rating of the content item is received. A ranking of the content item is determined with respect to the event, relative to one or more other content items associated with the event based at least in part on the relevance and the user rating. In some embodiments, the ranking is determined based at least in part on a sentiment score associated with the content item.

In some embodiments, the ranking algorithm disclosed provides a novel method for retrieving, scoring, ranking, and presenting content related to an event based on a combination of: Geography, Time, Similarity, Sentiment, User rating and User preferences. It is aimed at providing users with the most relevant, engaging, and informative content concerning events of interest to them.

2 DESCRIPTION

This document presents the components of a content ranking algorithm and describes the various scoring contributions that it utilizes.

2.1 Conceptual Description

The ranking algorithm dynamically combines the various scoring contributions in different ways over time, as the importance of those respective contributions (see section 2.3) will vary over time. The overall scoring method for a content item and an event are both defined in section 2.4. An example of a typical scoring history for a content item in the system can be seen in 5.

The most basic element of scoring a content item is its relevance to a given event in the information retrieval sense, i.e., some characterization of similarity to a query or set of queries, or to a base or "seed" content item or set of items, associated with the event. This scoring contribution provides a baseline characterization of how topically related the content item is to that event. The model of similarity is fundamentally text overlap, for example using the standard TF-IDF (term frequency-inverse document frequency) model, overlap of named entities, or similar measures.

Two additional scoring contributions also address the topical relevance of a content item to an event: temporal and geographic proximity of times and locations mentioned in the content item, or attached as metadata to the content item, to times and locations associated with the event.

The ranking algorithm also assesses the emotional impact of content items, in terms of valence (i.e., positive or negative and with what intensity), as part of the process of ranking those items. This scoring contribution allows the system to identify and prioritize potentially high-impact content.

Finally, the ranking algorithm also employs user ratings as one of its scoring contributions. The user rating score (U(t), see section 2.3.1) is defined by both the number and value of user votes (s(t)) with user reputation ($h_m(t)$) taken into account. Basically, a few votes by highly reputable users will have the same effect as a large number of votes from less reputable users. This behavior is defined by the equations (3) and (4).

For small numbers of user votes, the overall score of a content item will be primarily defined by the relevance score (R(t), see section 2.3.2) and the emotional score (E(t), see section 2.3.3). As the number of user votes grows. i.e., becomes statistically reliable, the effect of the user votes increases.

Finally, as the number of user votes increases further, the importance of additional user votes decreases. This behavior is modeled by the weight function defined in equation (9).

User reputation is based on both long term and short term interaction with the system. By defining the user reputation as a function of both long term and short term interactions in this way, the algorithm is forgiving of isolated "mistakes" by users, such as submission of low quality content, or less frequent visits to the system. On the other hand, long term abusive behavior will result in much slower growth of a user's reputation. The exact definition of the user reputation, hm(t), is found in 2.2.

An event score is defined by a weighted sum of the user rating score of the event itself and the (possibly weighted) average total score of the content items associated with that event. It can easily be extended to be valid for non-linear weights.

2.2 Definition of the User Reputation, $h_m(t)$

The user interaction score, $u_s(t)$, measures the interactivity of a user with the system. Some general characteristics of the user interaction score include:

1 The larger the number of visits, the higher user interaction score.
2 The higher frequency of revisits, the higher user interaction score.
3 Attempts to cram the system, as well as abusive behavior or language, will lower the user's interaction score.
4 The quality of a user's submitted content is also an important factor in his or her interaction score.

Figure 1:
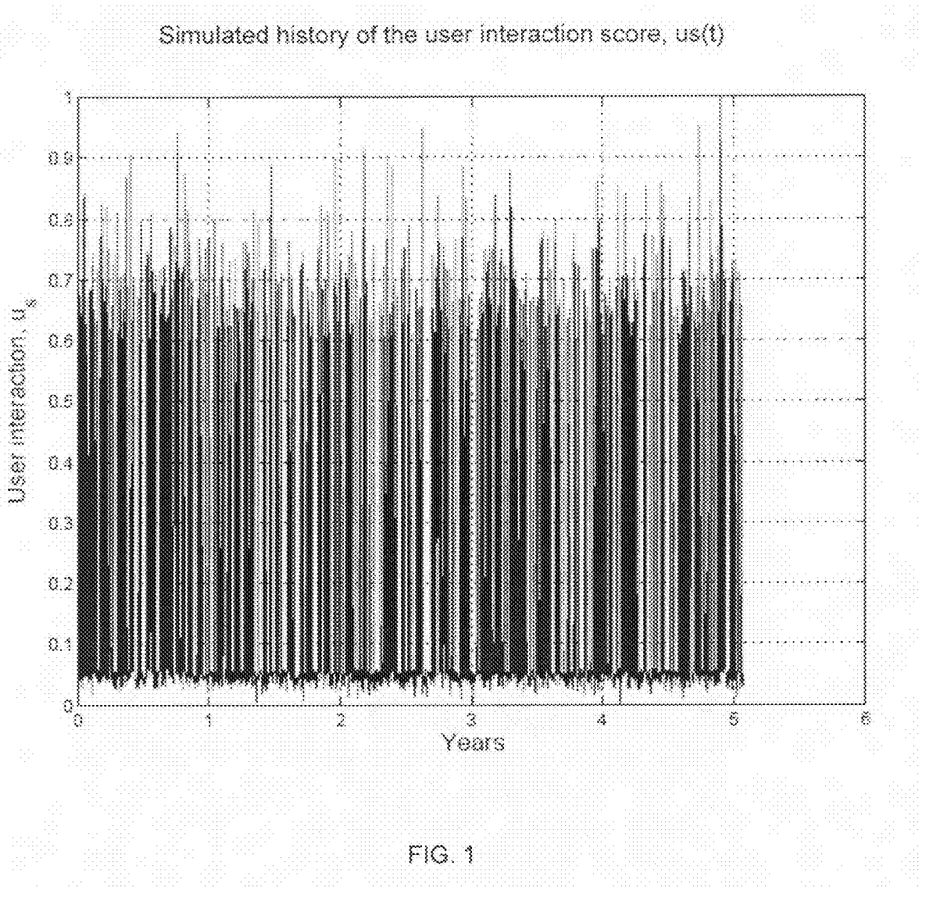
FIG. 1 is a graph illustrating a simulated history of the user interaction score, us(t), in one embodiment.
Figure 2:
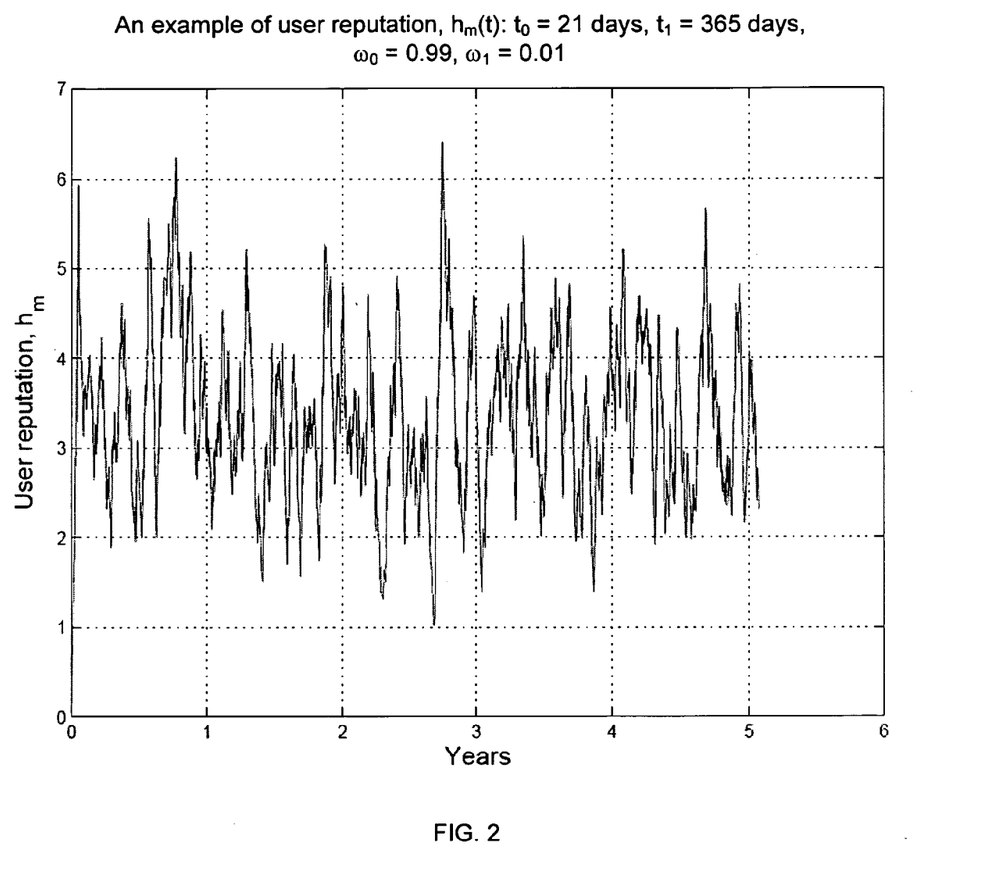
FIG. 2 is a graph illustrating an example of user reputation, $h_m(t)$: $t_0=21$ days, $t_1=365$ days, $\omega_0=0.99$, $\omega_1=0.01$ in some embodiments.

An example of a user interaction history, $u_s(t)$, is shown in FIG. (2).

User reputation is defined as a weighted sum of the long term user interaction history (defined by the model parameter $t_1$) as well as the more recent user interaction history (defined by the model parameter $t_0$) inside the system. (See FIG. (2) for the effect of variations of these model parameters.) The user reputation, $h_m(t)$, of a user m is then given by a weighted sums of the different partial user reputations, $h_{i,m}$, $$h_m(t) = \begin{cases} \omega_1 \cdot h_{-1,m} & \text{for } t < t_0 \\ \omega_1 \cdot h_{-1,m} + \omega_0 \cdot h_{0,m} & \text{for } t_0 \leq t < t_1 \\ \omega_1 \cdot h_{1,m} + \omega_0 \cdot h_{0,m} & \text{for } t \geq t_1 \end{cases} \quad (1)$$

where $\omega_1$ and $\omega_0$ are weights and $\omega_0+\omega_1=1$. The respective partial user reputation $-h_{-1,m}$, $h_{0,m}$ and $h_{1,m}$—is defined as, $$h_{i,m}(t) = \begin{cases} \int_{\tau_{i,0}}^{t} u_s(\tau) \cdot \exp\left(\frac{\tau - t}{t_i}\right) d\tau & \text{for } i = -1 \text{ and } t < t_0 \\ \int_{\tau_{i,0}}^{t} u_s(\tau) \cdot \exp\left(\frac{\tau - t}{t_i}\right) d\tau & \text{for } i = -1, 0 \text{ and } t_0 \leq t < t_1 \\ \int_{\tau_{i,0}}^{t} u_s(\tau) \cdot \exp\left(\frac{\tau - t}{t_i}\right) d\tau & \text{for } i = 0, 1 \text{ and } t < t_1 \end{cases} \quad (2)$$

where $t_{-1}=t_1$, $\tau_{-1,0}=0$, $\tau_{0,0}=t-t_0$ and $\tau_{1,0}=t-t_1$ and $u_s(\tau)$ is the user interaction score at time $\tau$. Note that $\tau-t \leq 0$ for all $t \geq 0$. The integral can be computed using simple numerical integration.

The model parameters $-t_0$, $t_1$ and $\omega_0$—enable You to control the relative weight between recent and long term actions. A too high ratio of $t_1/t_0$ will damp fluctuations of the user reputation over time. For $t_1=1000$ days (almost 3 years), there is a visual artifact that you obtain an overall growth in the user reputation, $h_m(t)$, for higher $t_1$. This artifact is purely an effect of the formulation of equation (1) and can be eliminated by introducing time-dependent weights $\omega_0(t)$ and $\omega_1(t)$. Large values of $\omega_0$ will drastically damp high-frequency fluctuations in the user reputation in time. Basically, choosing large values of $\omega_0$ results in low-frequency fluctuations in the user reputation, $h_m(t)$, in time.

2.3 Definition of the Scoring Contributions

Figure 3A:
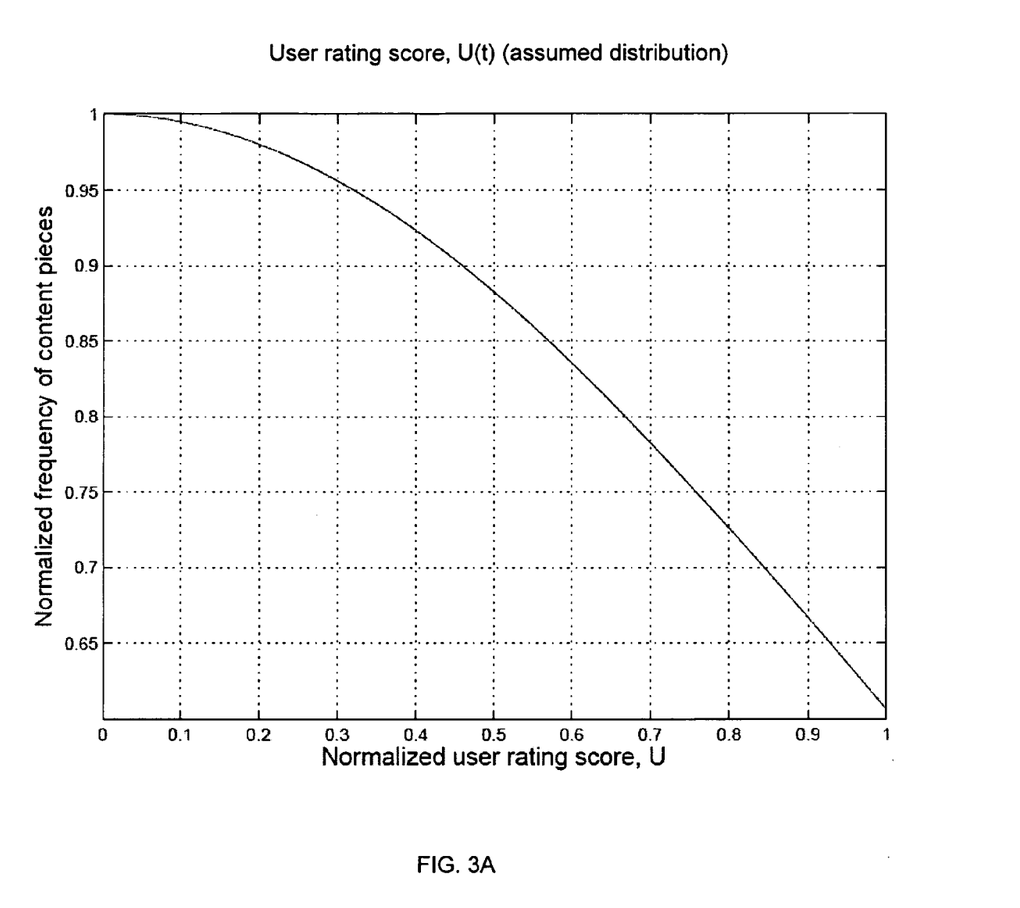
FIGS. 3A, 3B, and 3C are graphs illustrating embodiments of the distribution of the different scoring contributions. The scores are normalized to make it easier to compare the different scoring contributions, and the normalized frequency refers to relatively how many documents obtain a particular score.
Figure 3B:
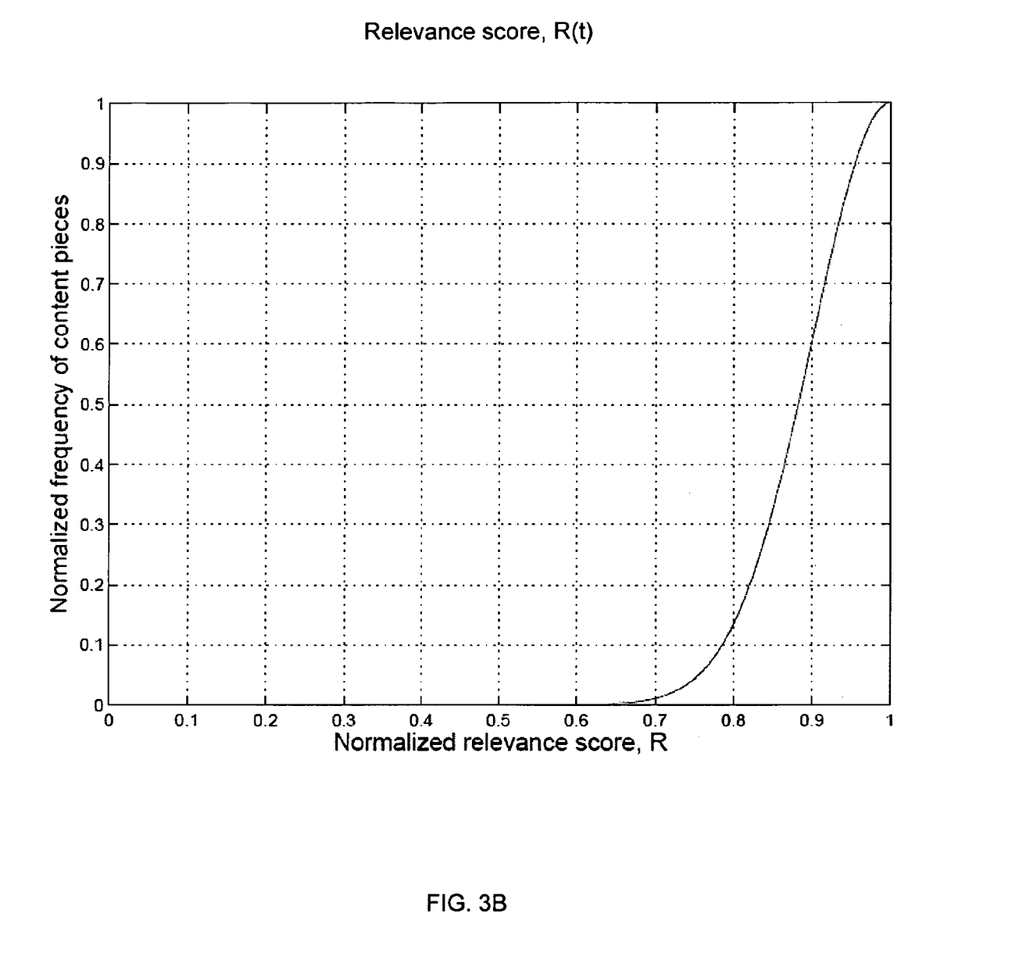
Figure 3C:
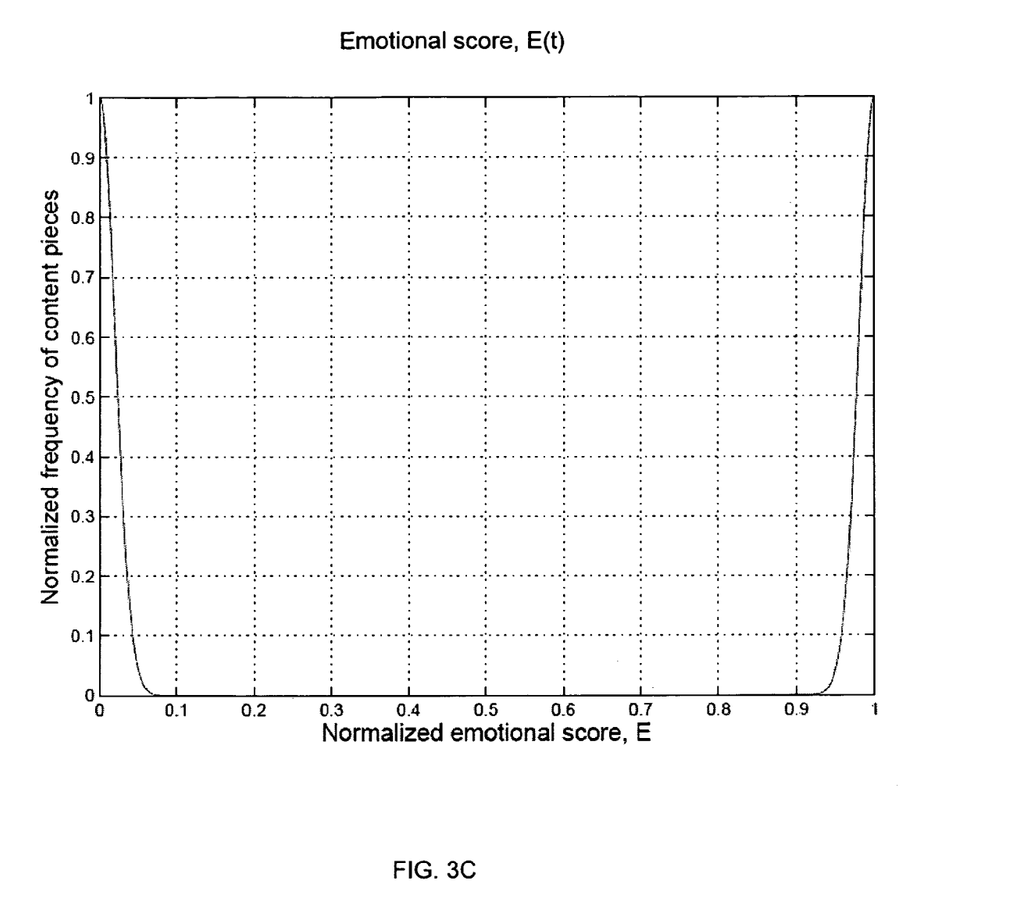

The scoring distributions are shown in FIG. (3). FIGS. 3A, 3B, and 3C are graphs illustrating the distribution of the different scoring contributions in one embodiment. The scores are normalized to make it easier to compare the different scoring contributions, and the normalized frequency refers to relatively how many documents obtain a particular score.

2.3.1 User Rating Score, U(t)

The importance of user rating contribution should increase over time, but should also be bounded for large t. Furthermore, to handle different abusive behaviors in online communities such as creation of multiple accounts to vote multiple times, other cramming attempts, and/or to fight online trolls, each user vote, $s_m^j$, should be weighted depending on their user reputation, $h_m$. The user rating contribution can easily be extended to vary in different stages of the event detection process.

As the system will automatically detect such interactions such attempts will result in a lower user interaction score and consequently a lower effective user rating score. The system allows the user interaction behavior to be dynamic over time, and the formulation of the user reputation ensures that the system automatically responds to such attempts and recalculates the total score of a content item in response.

Let $s^j$ be the user vote by user m on the content piece j, $h_m(t)$ the reputation of the user m and $\omega(u)$ be the weighting function depending of the user reputation h(t). (Note that $\omega(u)$ is a different weight than the previously mentioned $\omega_0$ and $\omega_1$)

Furthermore let $S^j=S^j(t)$, be the set of users who have voted on a content piece j. The total user rating score, $U^j=U^j(t)$ for a content piece j, will then be defined as, $$U^j \cdot (t) = \sum_{n \in S^j(t)} \omega(h_m(t)) \cdot s_n^j = \sum_{n \in S^j(t)} s_{e,n}^j, \quad (3)$$

where $s_{e,n}^j$ is the effective user rating score. The weight function below has been specifically designed to solve the issues previously mentioned. It gives low weight for users with low reputation and for the intermediate interval of the user reputation has an only slightly varying constant weight (Part 1) and controls the obtained weight for users with higher user reputation (Part 2). Also as the user reputation varies with time, the hierarchy in the system is time-dependent and thus also the effective vote, $s_{e,m}^j$, by a user m on the content item j.

The weight function, $\omega(h_m)$, is therefore defined as, $$\omega(h_m) = 1 + \overbrace{\left(\frac{h_m - h_m^1}{h_m^1}\right)^{h_m^2}}^{\text{Part 1}} \cdot \overbrace{\exp\left(-\frac{h_m}{h_m^3}\right)}^{\text{Part 2}} \quad (4)$$

where $h_m^i$ are model parameters.

2.3.2 Relevance Score, R(t)

The relevance score, R(t), measures how relevant an item of content is to a particular event. An event is a collection of stories, blogs, user contributions, videos and images and can thus be considered as a container of content items j. (Typical events are, for instance, "The Conflict in Lebanon", "The tragic death of Josh Hancock" or "Tom Cruise and Katie Holmes wedding"). The relevance score of an item will depend on:

Geographical overlap between the content item and the event

Temporal overlap between the content item and the event

Similarity between the content item and the event as described earlier.

2.3.3 Emotional Score, E(t)

An important element of any story, video or image is the emotional element, which determines the emotional impact a particular item of content has. The emotional score, E(t), provides a quantitative measure on the sentiment, attitude and/or opinion of piece of content—whether it is positive or negative, and how much. Sentiment of a content item in this sense can be assessed using a variety of statistical or other methods, for the most part derived from corpora of labeled data used to determine features or feature combinations indicative of particular sentiment values.

2.4 Definition of the Scores

2.4.1 The Score of a Content Item

A content item can be a document, an image, a video or any other type of content in the system. The score of a content item j is denoted, $g^j$, and is defined as a weighted sum of its scoring contributions. Let the vector of the scoring contributions be defined as $$v^j(t)=[U^j(t)R^j(t)E^j(t)],$$

where $v_i^j(t)$ denotes the $i^{th}$ element of the vector $v^j(t)$. The score, $g^j$, is then defined by, $$g^j(t) = g^j(U^j(t), R^j(t), E^j(t)) \quad (5)$$

$$= \frac{\sum_{i=1}^{3} \omega_i^j(U^j(t), R^j(t), E^j(t)) \cdot N_i \cdot v_i^j(t)}{\sum_{i=1}^{3} \omega_i^j(U^j(t), R^j(t), E^j(t))}$$

where $N_i$ is the normalization constant of contribution i and $\omega_i^j$ are the weight function for the vector element $v_i^j(t)$. The scores need to be normalized as the different scores result from different sorts of computation, have different magnitudes, and aren't directly comparable. The weight functions used in the scoring model are, $$\omega_1^j = \omega_1^0 \cdot f(U^j(t)) \text{(user rating score weight)} \quad (6)$$

$$\omega_2^j = \omega_2^0 \text{(relevance score weight)} \quad (7)$$

$$\omega_3^j \text{(emotional score weight)} \quad (8)$$

where $\omega_i^0$ is the model parameter for weight of scoring contribution i. The weighting function, $f(U^j(t))$, is defined as, $$f(U^j(t)) = \begin{cases} \exp\left(\frac{U^j(t) - U_1}{U_1}\right) & \text{for } U^j(t) \leq U_1 \\ \exp\left(\frac{U_1 - U^j(t)}{U_1}\right) & \text{otherwise.} \end{cases} \quad (9)$$

Figure 4A:
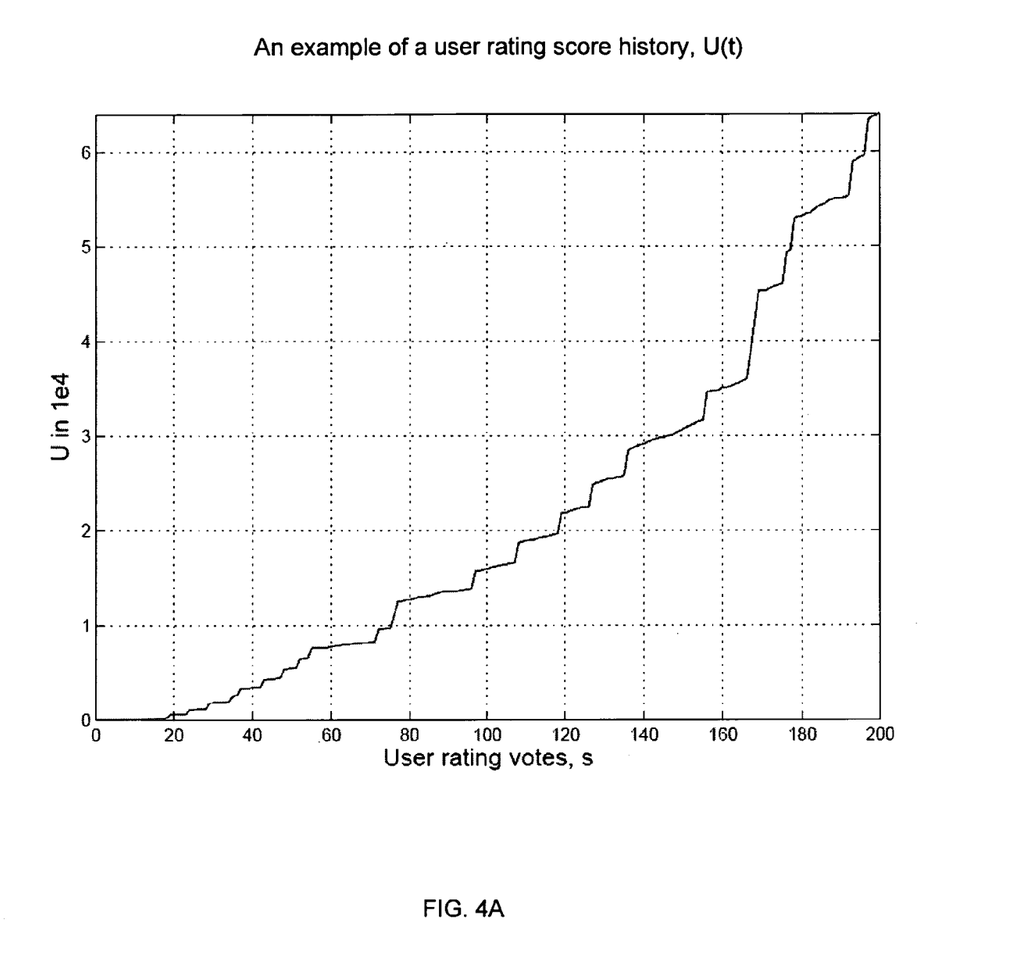
FIGS. 4A and 4B are graphs illustrating an example of a user rating score, $U(t)$, and the corresponding weight function, $f(U)$, for U1=20000 as a typical history of user votes, s, in one embodiments.
Figure 4B:
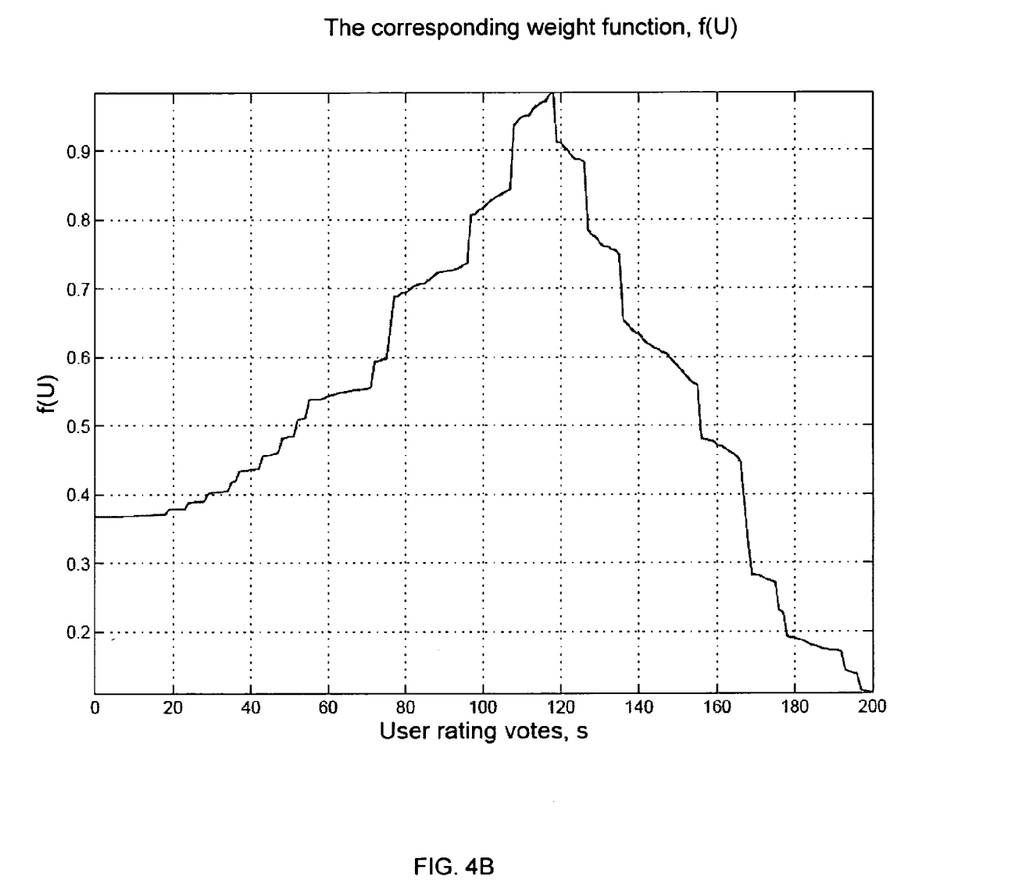
Figure 5A:
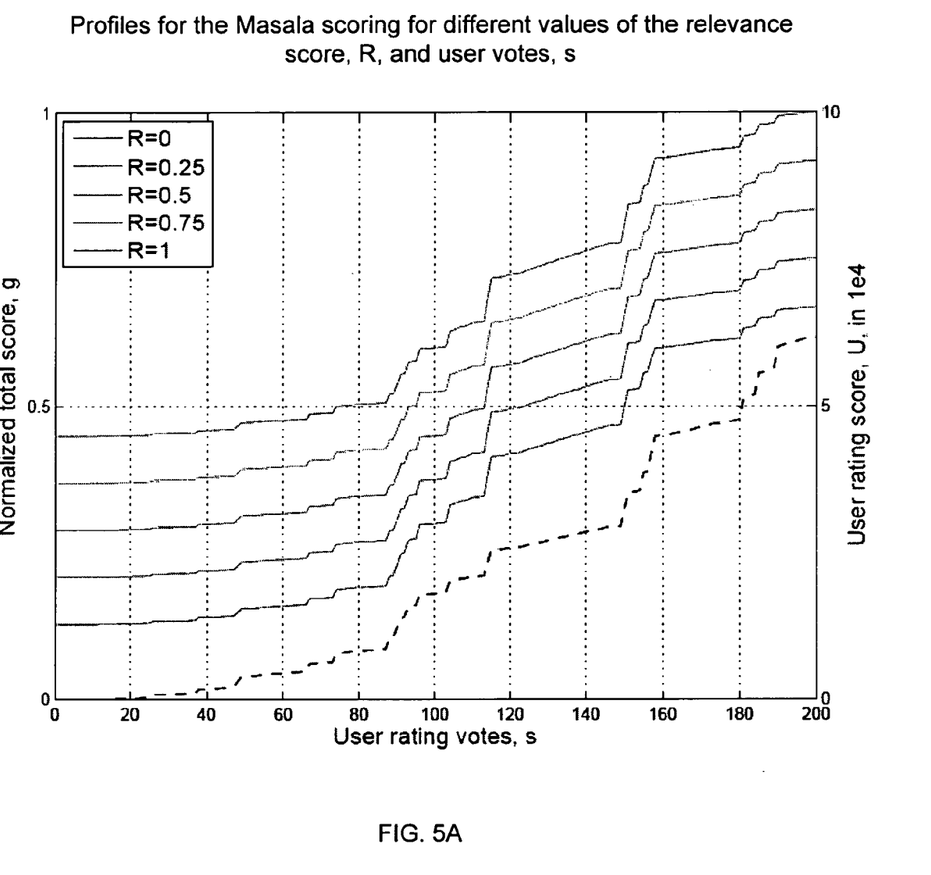
FIGS. 5A, 5B, 5C, and 5D are graphs illustrating an example of a total Masala score for a content piece for a user score history for U1=20000, $\omega_1^0=0.2$, $\omega_2^0=0.4$, and $\omega_3^0=0.4$.
Figure 5B:
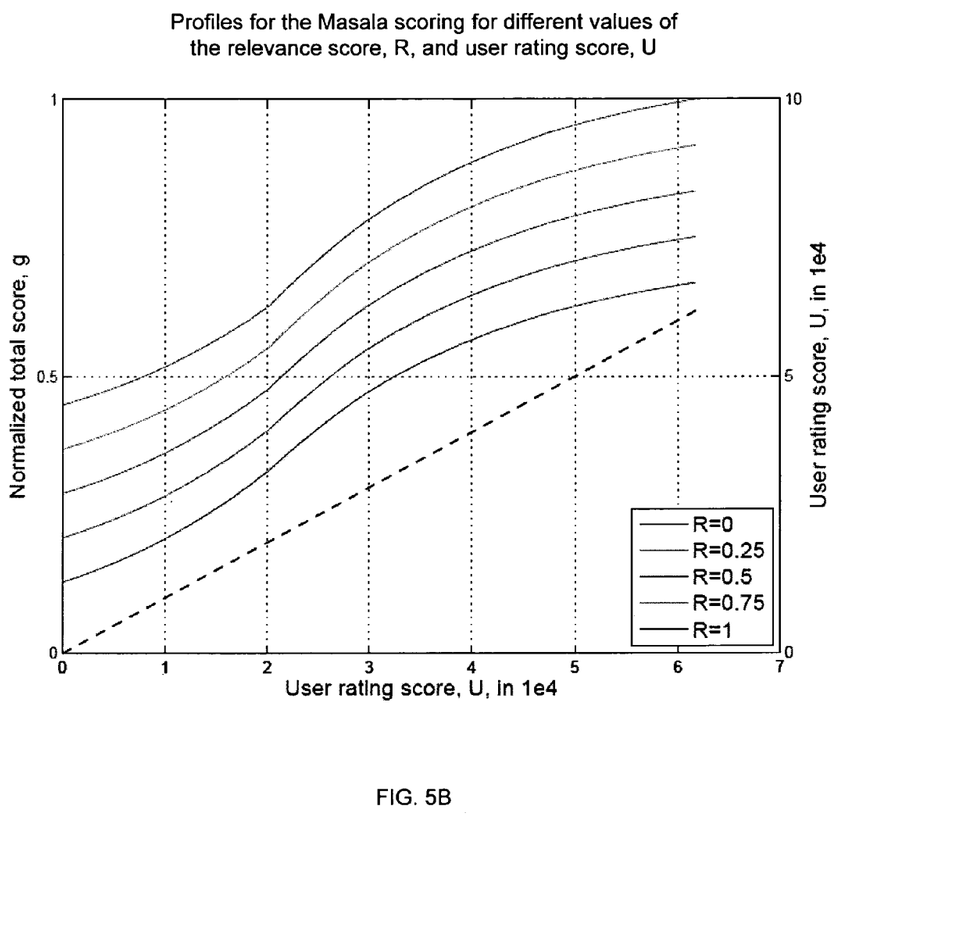
Figure 5C:
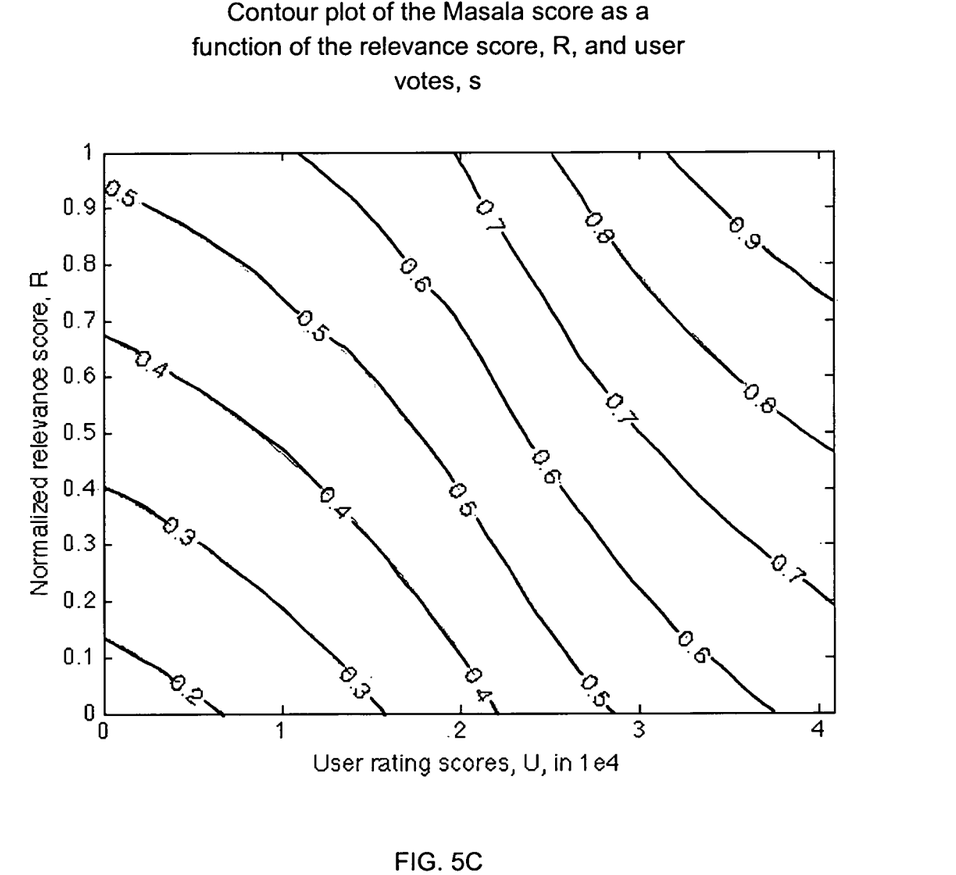
Figure 5D:
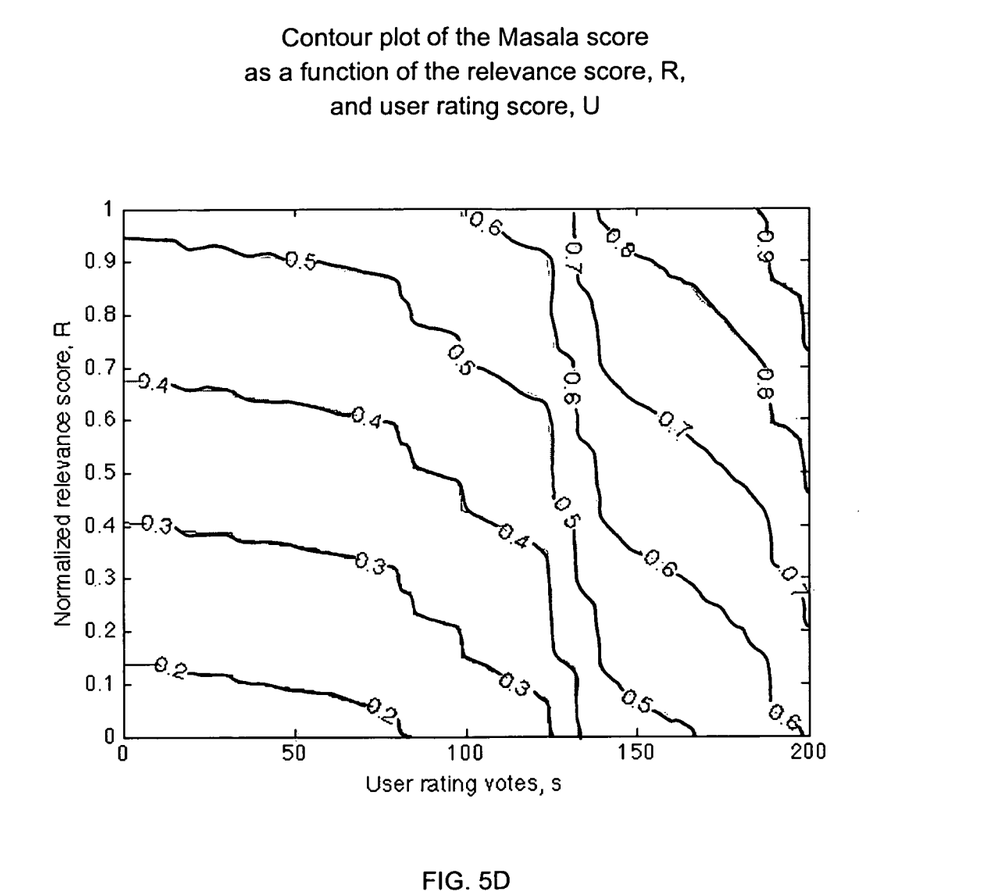

FIGS. 4A and 4B are graphs illustrating an example of a user rating score, U(t), and the corresponding weight function, f(U), for U1=20000 as a typical history of user votes, s, in one embodiment.

Some examples and basic sensitivity analysis of the score are presented in FIG. 5. FIGS. 5A, 5B, 5C, and 5D are graphs illustrating an example of a total score for a content piece for a user in one embodiment for U1=20000, $w_1^0=0.2$, $w_2^0=0.4$, and $w_3^0=0.4$.

2.4.2 The Event Score

Let the user rating score for the event k itself be $U_k^0$, the average score for the associated content to event k, $\bar{g}_k^{-ac}$ and $\omega_k$ a weight factor. The total event score can then be defined as.

$$g_k(t) = \omega_k \cdot U_k^0(t) + (1-\omega_k) \cdot \bar{g}_k^{-ac}(t) \quad (10)$$

Note that the total event score is then only given by one model function $\omega_k$, and the respective scores $U_k^0(t)$ and $g_k^{-ac}(t)$ can be defined via one SQL-query.

3 DESCRIPTION OF THE PREFERRED EMBODIMENT

The system provides users with the ability to access and contribute content about events of interest to them, defining these events, tracking the evolution of the events over time, and organizing the events and the associated content to ensure users receive the most interesting and engaging experience. An event in its basic form is a collection of content items that refer to the same situation or circumstance. The scope of each event will be dynamic and vary over time. A content item may be a story, an image and/or a video. Both the content items and the events will be stored in databases and files, including XML-files.

The ranking algorithm is distributed throughout the system, and consists of both on-demand and batch processes, including steps of both a serial and parallel nature.

Step I: Defining the Scores and/or Updating the User Interaction Record:
 A content item is registered at the system:
  The content item is matched against existing seeds and events:
   If the content item matches the contextual scope of an event:
    Update user interaction history for the particular user and/or source submitting the content item
   If no matching event or seed is found to an item:
    Update user interaction record for the particular user and/or source submitting the content item
    Create a new event instance (seed) in the database
  Calculate scoring contributions:
   Calculate the emotional score of the content item
   Update the contextual state of the event
   Calculate the relevance scores for content items associated with the event
 A user interacts with the system:
  Switch depending on the types of interaction with the system:
   A user vote is registered:
    Update the user interaction record for
     1 the user initially submitting/creating the particular content item and/or event
     2. the user voting on the particular content item and/or event
    update the user votes
   A user abuse report is registered:
    Update the user interaction record for
     1. the user initially submitting on the content item or event
     2. the user filing the abuse report on the content item or event
   All other user interactions with the system:
    Update the user interaction records for the users affected by the particular interaction
  Redefine user reputations of affected users and calculate the user rating score
   Recalculate the user reputations for the users affected
   Calculate user rating score using the defined user reputations
Step II: Calculate the Final Scores:
 Calculate total score for the content item
 Update total event score
Step III: Update the State of the System
 Reprioritize content items for each event and the events
 Update the content storage

4 ADVANTAGES

The ranking algorithm provides an appropriate prioritization of the content related to an event, automatically and without relying on human intervention, and is therefore scalable. The algorithm utilizes a combination of different scoring contributions—user rating, relevance or similarity, geography, time, and emotional impact. The user ratings are weighted by user reputation to get the necessary slight community hierarchy structure, as it is well-known that a too-flat authority hierarchy internally can destroy groups as much as one that is too steep. The scoring algorithm solves some of the common problem's with user ratings by varying its contribution vis a vis other scoring contributions in a dynamic manner. The community help decide what is important, intelligent information retrieval technology help to decide what is relevant, and emotional analysis help to decide what is impactful. Therefore the ranking algorithm can assess and prioritize content along all these three dimensions—community, information retrieval, emotional analysis—jointly. The ranking algorithm, together with the event detection model, also enables the swift detection of breaking events, which any model based on human editing or community assessment alone will be unable to match.

The simplicity of the ranking algorithm makes it easy to implement but also makes the dynamics of the score predictable. The algorithm can also be easily extended to include additional scoring contributions, and it can be optimized via only a few model parameters. The formulation of the ranking algorithm makes it possible to introduce more complex weighting functions for different types of content, different users, and different types of events, varying over time as information about those events evolves.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of dynamic ranking and prioritizing content items over time, comprising:
 registering a user vote in a simulated history of a user interaction score over time;
 receiving a content item registered in a system, wherein the content item is associated with a seed event, wherein the seed event comprises a situation or a circumstance, and wherein the content item comprises a story, an image, or a video;
 calculating a baseline topical relevance score of the content item to the seed event by contributing temporal and geographic proximity of times and locations mentioned in the content item, or attached as metadata to the content item, to times and locations associated with the seed event, wherein the topical relevance score employs a dynamic user rating score, and wherein the dynamic user rating score comprises calculating a user abuse score based on attempts to cram by the user, abusive behavior by the user, abusive language by the user, or any combination thereof;
 calculating a user interaction score based on visits by the user, revisits by the user, or any combination thereof;
 calculating a user reputation weight based on the user abuse score and the user interaction score;
 calculating a user emotional score as a quantitative measure on sentiment, attitude, opinion, or any combination thereof of a piece of content;
 matching the content item with existing events to form a group so that the content item is one of a plurality of content items associated with the same event, wherein the matching is based on a relevance score of the content item to the seed event, wherein the relevance score of the content is a dynamically scoring model of a weighted sum of normalized scoring contributions over time, and wherein the relevance score of each event in the group exceeds a predefined threshold value;
 creating a new seed event in the event that no matching event is located and updating the user interaction score;
 receiving from each of one or more users a user submitted input indicating an opinion of the user with respect to the content item; and
 determining, using a processor, a ranking of the content item relative to one or more other content items in the plurality of content items associated with the same event of the group, wherein the ranking is based at least in part on the user submitted input, and wherein a degree to which the ranking of the content item is affected by the user submitted input is based—at least in part on how many users have submitted an input, and wherein the degree to which the ranking of the content item is affected by the user submitted input is based at least in part on the user reputation weight of the user that submitted the user submitted input; and prioritizing the content item with respect to the plurality of the content items related to the event automatically using the ranking;

updating the user interaction score and recalculating user rating score, user reputation score, the content item score, and the emotional score based on a subsequent user interaction; and reprioritizing the content items for each seed event based on a combination of the updated user interaction score and the recalculated scores.

2. The method as in claim 1, wherein the degree to which the user submitted input affects the ranking of the content item is determined by a total user score, wherein the total user score comprises a sum of the user submitted inputs of however many users have submitted user inputs weighted by each user's reputation.

3. The method as in claim 1, wherein the user reputation weight comprises a weighted sum of a long term user interaction history and a recent user interaction history.

4. The method as in claim 1, wherein the content item relates to one or more of the following: an event, a location, an image, a video, a blog entry, or a face image.

5. A system for dynamic ranking and prioritizing content items over time, comprising:

a processor configured to:

register a user vote in a simulated history of a user interaction score over time;

receive a content item registered in a system, wherein the content item is associated with a seed event, wherein seed the event comprises a situation or a circumstance, and wherein the content item comprises a story, an image, or a video;

calculate a baseline topical relevance score of the content item to the seed event by contributing temporal and geographic proximity of times and locations mentioned in the content item, or attached as metadata to the content item, to times and locations associated with the seed event, wherein the topical relevance score employs a dynamic user rating score, and wherein the dynamic user rating score comprises calculate a user abuse score based on attempts to cram by the user, abusive behavior by the user, abusive language by the user, or any combination thereof;

calculate a user interaction score based on visits by the user, revisits by the user, or any combination thereof;

calculate a user reputation weight based on the user abuse score and the user interaction score;

calculating a user emotional score as a quantitative measure on sentiment, attitude, opinion, or any combination thereof of a piece of content;

match the content item with existing events to form a group so that the content item is one of a plurality of content items associated with the same event, wherein the matching is based on a relevance score of the content item to the seed event, wherein the relevance score of the content is a dynamically scoring model of a weighted sum of normalized scoring contributions over time, and wherein the relevance score of each event in the group exceeds a predefined threshold value;

create a new seed event in the event that no matching event is located and updating the user interaction score;

receive from each of one or more users a user submitted input indicating an opinion of the user with respect to the content item; and determine a ranking of the content item relative to one or more other content items in the plurality of content items associated with the same event of the group, wherein the ranking is based on at least in part on the user submitted input, and wherein a degree to which the ranking of the content item is affected by the user submitted input is based—at least in part-on how many users have submitted an input, and wherein the degree to which the ranking of the content item is affected by the user submitted input is based at least in part on the user reputation weight of that submitted the user submitted input; and prioritize the content item with respect to the plurality of the content items related to the event automatically using the ranking;

update the user interaction score and recalculate user rating score, user reputation score, the content item score, and the emotional score based on a subsequent user interaction; and reprioritize the content items for each seed event based on a combination of the updated user interaction score and the recalculated scores; and a memory coupled to the processor and configured to provide the processor with instructions.

6. A computer program product for dynamic ranking and prioritizing content items over time, the computer program product being embodied in a non-transitory computer readable storage medium and comprising computer instructions for:

registering a user vote in a simulated history of a user interaction score over time;

receiving a content item registered in a system, wherein the content item is associated with a seed event, wherein the seed event comprises a situation or a circumstance, and wherein the content item comprises a story, an image, or a video;

calculating a baseline topical relevance score of the content item to the seed event by contributing temporal and geographic proximity of times and locations mentioned in the content item, or attached as metadata to the content item, to times and locations associated with the seed event, wherein the topical relevance score employs a dynamic user rating score, and wherein the dynamic user rating score comprises calculating a user abuse score based on attempts to cram by the user, abusive behavior by the user, abusive language by the user, or any combination thereof;

calculating a user interaction score based on visits by the user, revisits by the user, or any combination thereof;

calculating a user reputation weight based on the user abuse score and the user interaction score;

calculating a user emotional score as a quantitative measure on sentiment, attitude, opinion, or any combination thereof of a piece of content;

matching the content item with existing events to form a group so that the content item is one of a plurality of content items associated with the same event, wherein the matching is based on a relevance score of the content item to the seed event, wherein the relevance score of the content is a dynamically scoring model of a weighted sum of normalized scoring contributions over time, and wherein the relevance score of each event in the group exceeds a predefined threshold value;

creating a new seed event in the event that no matching event is located and updating the user interaction score;

receiving from each of one or more users a user submitted input indicating an opinion of the user with respect to the content item; and determining a ranking of the content item relative to one or more other content items in the plurality of content items associated with the same event of the group, wherein the ranking is based at least in part on the user submitted input, and wherein a degree to which the ranking of the content item is affected by the user submitted input is based at least in part on how many users have submitted an input, and wherein the degree to which the ranking of the content item is affected by the user submitted input is based at least in part on the user reputation weight of the user that submitted the user submitted input; and prioritizing the content item with respect to the plurality of the content items related to the event automatically using the ranking;

updating the user interaction score and recalculating user rating score, user reputation score, the content item score, and the emotional score based on a subsequent user interaction; and reprioritizing the content items for each seed event based on a combination of the updated user interaction score and the recalculated scores.

7. The system as in claim 5, wherein the degree to which the user submitted input affects the ranking of the content item is determined by a total user score, wherein the total user score comprises a sum of the user submitted inputs of however many users have submitted user inputs weighted by each user's reputation.

8. The system as in claim 5, wherein the user reputation weight comprises a weighted sum of a long term user interaction history and a recent user interaction history.

9. The system as in claim 5, wherein the content item relates to one or more of the following: an event, a location, an image, a video, a blog entry, or a face image.

* * * * *